United States Patent [19]

Severt

[11] Patent Number: 4,568,070
[45] Date of Patent: Feb. 4, 1986

[54] POSITIONING AND TURNING APPARATUS

[76] Inventor: Wilhelm Severt, Venn Diek 21, 4426 Vreden, Fed. Rep. of Germany

[21] Appl. No.: 591,629

[22] Filed: Mar. 20, 1984

Related U.S. Application Data

[63] Continuation-in-part of Ser. No. 416,514, Sep. 9, 1982, abandoned.

[30] Foreign Application Priority Data

Sep. 15, 1981 [DE] Fed. Rep. of Germany ....... 3136474
Mar. 2, 1984 [DE] Fed. Rep. of Germany ....... 3407780

[51] Int. Cl.$^4$ .............................................. B23K 7/10
[52] U.S. Cl. ........................................ 269/60; 269/61; 269/71
[58] Field of Search ............... 269/58, 61, 71, 60, 269/289 R; 51/165.72

[56] References Cited

U.S. PATENT DOCUMENTS

| | | | |
|---|---|---|---|
| 1,812,585 | 6/1931 | Collins | 269/61 |
| 2,740,331 | 4/1956 | Schwartz et al. | 269/61 |
| 2,741,830 | 4/1956 | Lewis | 269/61 |
| 3,083,594 | 4/1963 | Budney et al. | 269/61 |
| 3,868,101 | 2/1975 | Nozaki et al. | 269/61 |
| 4,005,552 | 2/1977 | Hoglund et al. | 51/165.72 |
| 4,067,562 | 1/1978 | Weber | 269/71 |
| 4,200,273 | 4/1980 | Gupta et al. | 269/61 |
| 4,317,560 | 3/1982 | Troyer | 269/61 |

FOREIGN PATENT DOCUMENTS

| | | | |
|---|---|---|---|
| 2413024 | 10/1975 | Fed. Rep. of Germany | 269/71 |
| 2815407 | 10/1978 | Fed. Rep. of Germany | 269/71 |

Primary Examiner—Robert C. Watson
Attorney, Agent, or Firm—Jordan and Hamburg

[57] ABSTRACT

In a positioning and turning apparatus for the machining of heavy workpieces, the problem of inaccuracies caused by bearing play and drive stresses and standing in the way of a sensitive and accurate setting and thus the use of numerical controls and controlled positions is eliminated by using ring bearings with a large cross-section which can be used as compact building units and connected to large drive-geared wheels, resulting in a definite gain as regards rigidity, freedom from play and precision. With a cross carrier on the carrier of a positioning and turning apparatus, the workpiece is translatorily movable in addition to its rotatability around two axes, being adjustable particularly with respect to the axis of rotation so that an optional radius can be set in the case of curved machining like, for example, curved welding seams.

14 Claims, 4 Drawing Figures

POSITIONING AND TURNING APPARATUS

This is a continuation-in-part application of U.S. Ser. No. 416,514 filed Sept. 9, 1982 now abandoned.

BACKGROUND OF THE INVENTION

This invention relates to a positioning and turning apparatus.

Positioning and turning arrangements of this type make it possible to improve and facilitate manipulation of large workpieces, especially for metallic arc welding, and herein, especially to provide access to large workpieces and the alignment of such workpieces in preferred positions, such as, for instance, the trough position in welding. These developments have been limited in regard to receiving capacity, construction size and precision, thereby preventing not only operational efficiency, but also, most importantly, a breakthrough to greater automation.

It is, therefore, an object of the invention to provide a positioning and turning apparatus of the aforementioned type in such a way that it will make it possible to handle large loads of workpieces at reasonable construction costs, while at the same time making exact, sensitive adjustment in workpiece positions possible so that even heavy and large workpieces can be dealt with in automatized work processes, such as, for example, by means of computerized positioning.

It has been found that an especially weak feature of the bearing support mounting arrangement exists at the turning joints, and above all, in the turning joint between the stand and carrier. With increasing loads, the traditional mounting support over two shaft bearings arranged at an axial distance from each other required constantly larger distances and/or bearing support capacities, wherein however, precision requirements and the oscillating stability and constancy of the system could be increasingly less controlled. These oscillation problems affected the arm in regard to bending stress as also in regard to torsional stress, wherein the latter rendered the sensitivity of the setting or adjustment as well as the flow of the starting oscillation process unacceptable.

Also corresponding problems arose on the mounting of the positioning plate, although they were mainly dependent on position and of a relatively smaller magnitude.

A switching of the herein described type of mounting in only one bearing plane of large diameter leads to concepts in construction which allow making the stand much more compact, especially in the longitudinal direction of the carrier. Seen from the perspective of construction, besides greater compactness of the positioning plate, this also allowed for a different formation of breaking through the supporting surface with a ring formation of the positioning plate, making thus difficult or not-at-all accessible areas on the workpiece accessible. As an alternative regarding compactness, the possibility arises of a constructional stiffening for removing the oscillation sensitivity of the system and, also with increasing diameter of the bearing, the possibility of substantially reducing the side effects of bearing play in the axial as also in the radial direction.

Herein the large diameter provided by the bearing can at the same time be taken advantage of for setting and blocking rotation in order to achieve high sensitivity and precision. Thus the carrying side portion of the support bearing in the stand as also the plated side portion of the plate bearing at the carrier end can be connected to a toothed wheel or ring gear whose large radius results in exactness and sensitivity if a worm gear or similar device exercises control from the stand or the carrier.

This precision also represents a breakthrough for the application of automatized adjusting or setting methods, especially in combination with positional control devices and/or digital controls.

It is particularly advantageous that the positioning and turning apparatus has at least one adjustable carrier operable with the positioning plate for receiving the workpiece and the ring bearing at the end of the carrier. It is particularly advantageous if two adjustment carriers, arranged cross-wise in the form of a cross carrier are used. Thus, it is not only possible to bring the workpiece into every desired angle position but also to move it translatorily in the corresponding angle position. Furthermore, it is thus possible to move the workpiece in relationship to the ring bearing on the carrier so that it is moved opposite to the axis of the ring bearing. For highly accurate machining, for example in the case of welding of workpieces, the workpiece is then able to make the desired movements, while the tool—in the case of welding, the welding torch—is stationary. It has been shown that it is difficult in many cases to perform precise and non-oscillating movements with a tool suspended over a long arm or ceiling structure. In contrast, the positioning and turning apparatus allows very accurate working movements, particularly in the case of automated machining processes, eliminating the problems concerning inaccuracies and oscillation. It has also been shown that it is more favorable to move the workpiece and leave the tool stationary even if the workpiece is much heavier than the tool. The stable and precise support is of advantage when moving the workpiece while a comparable stable suspension of the tool would be exceedingly complicated.

Additional characteristics and advantages of the invention are disclosed in the claims and the subsequent description which include the objects of the invention and an embodiment illustrated by means of drawings.

DESCRIPTION OF THE PREFERRED EMBODIMENTS

Figure 1:
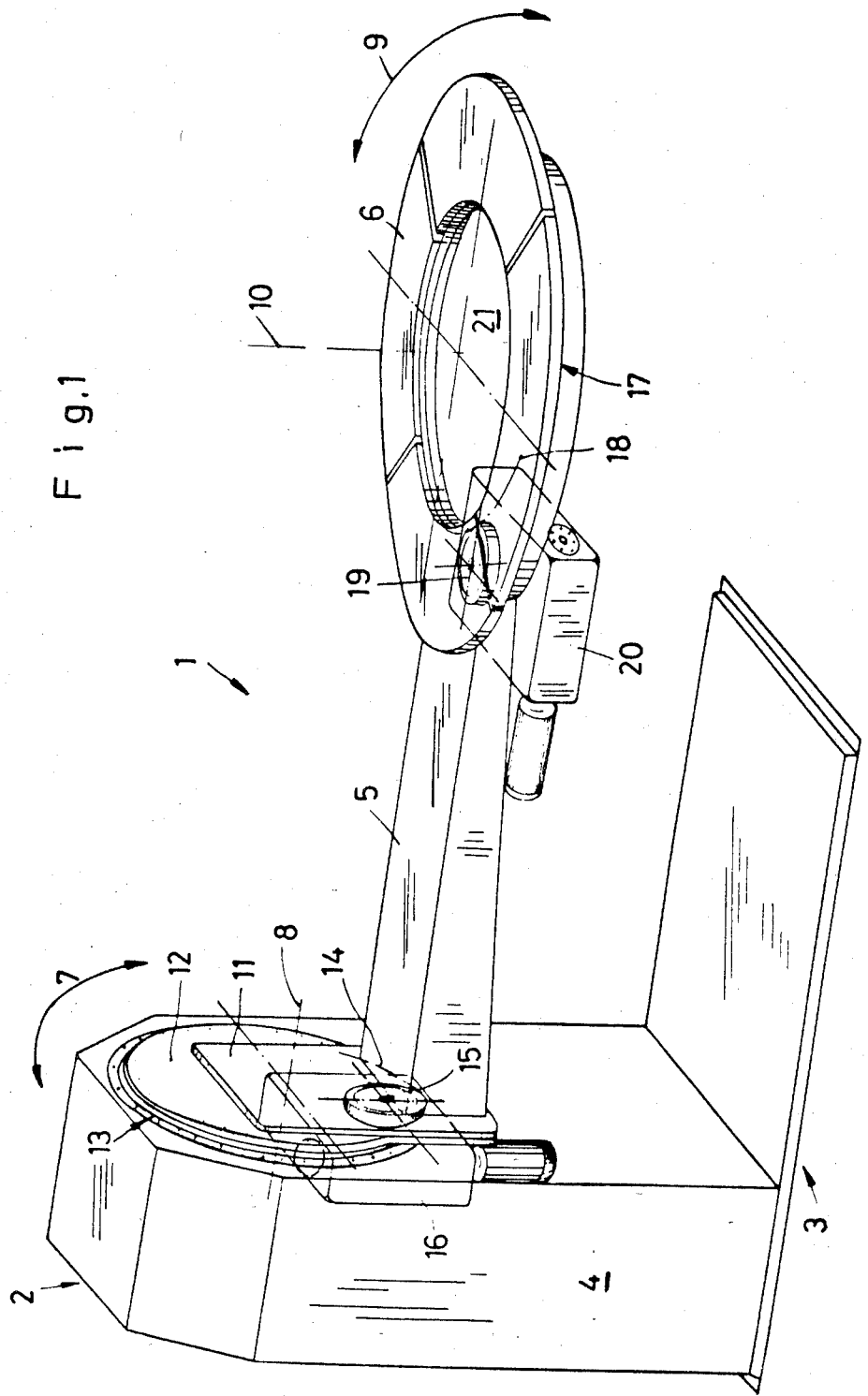
FIG. 1 shows a simple perspective view of a positioning and turning apparatus according to one embodiment of the invention.

The positioning and turning appartus, designated by the number 1 in the drawings, comprises a support stand and its totality has been designated by the number 2. The support stand 2 includes a base 3 which extends upwardly in the form of a box-shaped stand compartment 4. A carrier 5 is mounted on the stand compartment 4 with unlimited revolving ability. A positioning plate 6 is provided at the end of the carrier 5 with unlimited rotational ability. The arrow 7 indicates the rotational direction of carrier 5 about rotational axis 8. In the same manner the arrow 9 exemplifies the rotational direction of positioning plate 6 about vertical axis 10 represented in the horizontal position of the positioning plate. Basically, a workpiece may be turned into any desired angular position in relation to the bottom plane with the aid of these two rotary arrangements so that it will be possible to adjust to the preferred position especially for welding jobs.

Another, very substantial degree of freedom is the translational displacement or shifting of carrier 5 in relation to itself. As can be seen in the drawing carrier 5 is displaced in relation to its rotational axis 8, such displacement being adjustable by means of a flange plate 11 which lies flatly against a counterplate 12, being arrangeable in fixed but changeable positions in relation to the same. This makes a balancing compensation of heavy workpieces possible, the center of gravity of which (including calculation of the cantilever and the positioning plate) can be adjusted relative to the axis 8. This makes it possible to obtain a momentary neutral revolving support for the loaded carrier 5. The displacement by means of flange plates 11, 12 can, however, be used to provide for sufficient bottom space upon revolution around axis 8, especially when bulky or unwieldy workpieces are involved. Finally, the displacement arrangement can also be used in circular-shaped processing, for instance, in circular-shaped welding seams in which the workpiece with the carrier 5 is rotated around axis 8.

It should be understood that the precedingly cited problems of counterbalancing and freedom of movement are primarily of interest for large, heavy workpieces, the described basic construction only having special relevance in these cases. Such cases are, however, regularly linked to extremely high requirements as concerns precision and, in addition, present practice is increasingly putting forward requirements in regard to work-saving, ease of operation and also automatically achievable positioning of the workpiece. Up to now, limits were set to such requirements relatively to the possibility of obtaining fine or exact adjustments as also the possibility of exact, oscillation-free adherence to a predetermined position. It has been ascertained that the shaft bearings or support mountings and the basic concept prevailing up to now of a bearing and drive close to the shaft were the reasons for these difficulties.

The illustrated embodiment has a bearing support which does not act in the manner of a shaft bearing with axially displaced supports of momentary loads, but takes up the load over an annular ring bearing of large diameter. The annular ring bearing represented by numeral 13 supports the circular-formed flange plate 12, and thereby the carrier 5, on the face of stand 2. Concretely, a large antifriction bearing of about equal diameter is built behind the flange plate 12, the remaining bearing support of such antifriction bearing, in view of the large diameter, leads to reduced play as regards radial loads of the carrier 5 in the range of positioning plate 6. However, a gear 14 indicated by the dividing circle is also connected with the carrying side portion of the annular bearing 13 and the flange plate 12 which forms an internal gear tooth system. A pinion 15 engages the internal tooth system and is connected by a worm gear drive 16 which is supported on the side of the support frame. The backlash or flank clearance that cannot be completely overcome in gear mechanisms is reduced to a relatively small play by the large diameter of the gear mechanism. In addition, the large diameter of the gear wheel leads to correspondingly reduced momentary loads in the engagement area of pinion 15 so that thereby the mounting and drive will result in a breakthrough to a sensitive, precise adjustment of carrier 5. The formation of drive 16 as a worm gear, besides, leads to the same self-restraining qualities so that no additional break need be provided.

A compact, space-saving arrangement results from the point of view of construction while, at the same time, the flange plates 11, 12 are incorporated into the construction in an enhanced manner.

Also the mounting between positioning plate 6 and carrier 5 is provided by an annular ring bearing 17 of large diameter, preferably a large anti-friction bearing, which again has the special advantages of a compact but precise mounting bearing. Also the annular ring bearing is connected to a gear 18 at the side of the positioning plate which by its outer gear teeth arrangement makes meshing with a pinion 19 possible. The pinion 19 is part of a worm gear 20 mounted on carrier 5. Again, here also, reduced error possibilities and reduced driving loads with the corresponding advantages result concerning the arrangement as also regarding possible position-detracting deformation.

Also here, annular ring bearing 17 makes a flat, space-saving construction possible. In addition, it opens the possibility to form the positioning plate 6 ring-shaped with a free inside space 21 so that the workpiece also will be accessible from the bottom or from the lower side of the positioning plate to a very large extent.

The advantage obtained from annular ring bearings of high sensitivity and precision of adjustment or setting opens the way for the insertion of positioning controls and/or numerical controls. The present example of the illustrated embodiment provides for both, without the corresponding technical equipment necessary for the installation, known per se, having been illustrated in the drawings. The two worm gears 16, 20 may be equipped with a digital path generator, that is, an incremental optical path generator, which acknowledges the angular position of the positioning plate 6 on the face of carrier 5 or of carrier 5 on the face of the stand 2 to a computer in the stand. It is understood that the position generators may possibly also be connected to gear rims 14 or 18 in order to also include the transfer between the drive and the driven element as regards the positioning message. In view of the high precision and stiffness of the annular ring bearings and the large gear rims, it has, however, been shown to be fully sufficient to mark the position at the drive start. The "is" position is compared in a known manner with a "should-be" position, pre-given in typed-in or punched-in form, on a tape or similar arrangement, in terms of numbers, in order to determine the deviation to the rule, which is then fed into a subordinately stored rotational speed control loop for the corresponding worm gear drive 16 or 20. The drive obtained by the rotational speed control loop thus leads the "is" position to a "should-be" position without the need to still execute operations by hand which, when highly exact data are pre-given, and especially on the switch-on and switch-off of adjusting motors, can be time-consuming and bothersome.

Figure 2:
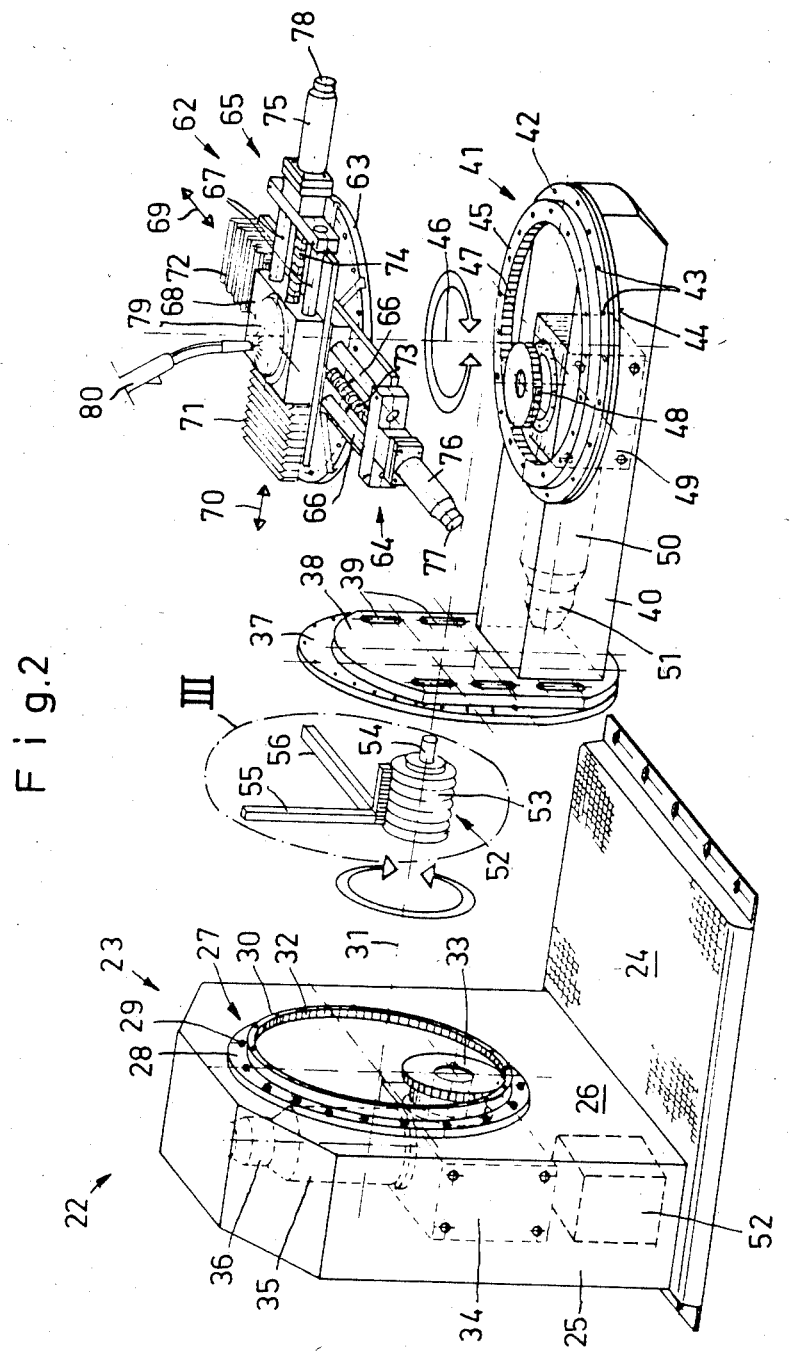
FIG. 2 is an exploded view of a second positioning and turning apparatus according to another embodiment.

FIG. 2 illustrates a positioning and turning apparatus designated as 22 in a disassembled state and showing structural components. A stand 23 is supported on the floor by a base 24 and has a housing 25 which has a ring bearing 27 on a frontal area 26 extending from the base 24. In this ring bearing, a rear ring 28 is fastened to the housing by screws 29 in order to rotatably support an interior ring 30 around a horizontal axis 31 via non-illustrated intermediate ball bearings. The interior ring 30 has gear teeth 32 on the inside which engage a gear wheel 33. The gear wheel extends in the direction of the axis 31 and has a drive 34 mounted in the housing 25. A motor 35 is flanged onto the drive, projecting upwardly and forming a unit drive motor with the drive 34. At the end of the motor 35, which is further from the drive 34, a coder 36 is mounted which is connected to the shaft of the motor and converts the revolutions of the motor into digital impulses. The coder has a well-known construction according to the principle of electro-optical incremental coders.

The interior ring 30 has a multitude of screw holes corresponding to screw holes on the circumference of a flange plate 37 which, in the assembled state of the apparatus, is screwed together with the interior ring 30 and which can be rotated around the axis 31 with the interior ring 30. The flange plate 37 extends transversely to the horizontal axis 31.

A flange plate 38 is disposed adjacent to the flange plate 37. The flange plate 38 has six longitudinal slots 39 through which bolts can be inserted in order to connect flage plates 37, 38 with one another. The flange plate 37 has similar longitudinal slots as the longitudinal holes 39 so that the two flange plates 37, 38 can be moved across a wide area transversely to the axis 31 towards one another and mounted with optional displacement.

The flange plate 38 is rigidly connected with a horizontal carrier 40 which in an assembled state extends parallel to the axis 31.

A ring bearing 41 with a large cross-section is mounted at the end of the carrier 40 and includes an outer ring 42 screwed onto a circular plate 44 by means of a plurality of circumferential screws 43 in order to rotatably mount an interior ring 45 around a vertical axis 46 directed transversely to the axis 31 and extending vertically in the drawings via (non-illustrated) intermediate ball bearings. The interior ring 45 has an interior gear 47, identical to the interior ring 30 of the ring bearing 27, which engages a gear wheel 48 driven by a drive motor which includes a drive 49 and a motor 50. The drive is mounted in the box-shaped hollow carrier 40 and the motor is flanged onto this drive. At the end of the motor 50, which is spaced from the drive 49, an electro-optical incremental angle coder 51 is mounted which is adjusted with the interior axis of the motor 50.

The interior ring 45 can be sensitively adjusted by means of the drive motor 49, 50 via the gear wheel 48 with the angle coder 51 monitoring the angle adjustments of the motor 50 and reporting to a control unit 52 via non-illustrated cables, the control unit comparing the reported position with a reference position and, in the case of deviations, controls the drive motor 49, 50 according to the principle of known position control devices.

In order to transfer the signals from the coder 51 and the electric signals for the drive motor 49, 50 to the optionally rotatable carrier 40, a sliding transmitter ring 52 is engaged between the rotatable carrier 40 and the stationary housing. The sliding transmitter ring has sliding rings 53 which are rigidly connected to a shaft 54 and mounted on the back of flange 37 so that they rotate with this. The stationary part of the sliding transmitter ring has two rods 55, 56, welded rigidly on the inside of the walls of the housing 25 with their ends disposed in a position so that the shaft 54 extends in the direction of the axis 31.

Figure 3:
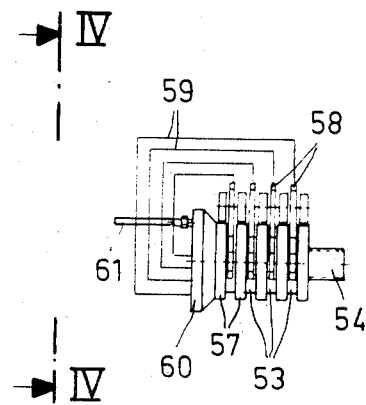
FIG. 3 is view taken along the line III in FIG. 2.

The actual sliding ring arrangement can be seen in FIG. 3. The shaft 54 is provided with an external thread by means of which it is screwed into the backside of the flange plate 37 into a nonillustrated threaded pipe. Several sliding rings 53 are rigidly connected to the flange plate 37 and are separated from one another by outwardly projecting, circular insulating washers 57.

Figure 4:
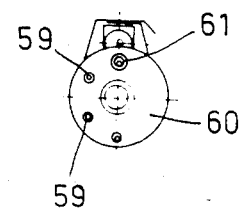
FIG. 4 is a view taken along the line IV—IV in FIG. 3.

The sliding rings 53 are contacted by brushes 58 which pick up the voltage signals. From here, individual cables 59 lead to a stationarily disposed terminal head 60 from which a cable 61 runs to the control device 52. The associated frontal view can be seen in FIG. 4.

The above-described construction of the embodiment in FIG. 2 corresponds to the schematically illustrated construction in FIG. 1.

However, here a positioning plate is not positioned directly on the interior ring. Instead, a cross carrier 62 is mounted on the interior ring 45 located on a circular bottom plate 63 which is in turn directly secured together with the interior ring 45.

The cross carrier 62 has a lower carrier 64 and an upper carrier 65. The lower carrier 64 has two sliding guides 66 on which the upper carrier 65 can be moved. The upper carrier has two similar sliding guides 67 on which a positioning plate 68 can be moved. The upper carrier is movable in the direction of the double arrow 69 and the positioning plate 68 is movable in the direction of the double arrow 70.

The construction of the cross carrier 62 is basically known. The guides 66, 67 are partially protected against contamination by covers 71, 72.

The upper and the lower carriers each have a drive worm 73 and 74 between the rod-shaped guides 66, 67 which can be rotated by means of drive motors 75 and 76. These drive motors, like motors 50 and 35, have coder devices 77, 78 at the end with which the angle position and number of revolutions of the worm and thus the position of the cross carrier is to be monitored in the direction of its two movement coordinates in accordance with the double arrows 69 and 70. The electric signals from the coder devices 77, 78 and the electric voltages for the drive motors 75, 76 are transferred over a non-illustrated sliding ring transmitter which is, however, identical to the sliding ring transmitter 52 from the rotatable cross carrier 62 to the carrier 40 and from there via the sliding transmitter ring 52 on the housing 25 to the control 52.

An approximately plate-shaped workpiece 79 has been illustrated on the positioning plate 68 while a welding torch 80 is directed towards a border area of the workpiece which is to be welded together.

The positioning plate 68 is thus not directly mounted on the ring bearing 41 but movable above the cross carriers 52 in the direction of two coordinates, perpendicular to one another, and parallel to the plane of the ring bearing 41.

This mobility is very important for the precise machining of large workpieces, in particular for the welding thereof. Such welding often requires a so-called "H.V. position", in which the line of the weld is brought in perpendicularly and symmetrically from above and runs in a horizontal direction. The workpiece 79 and the welding torch 80 have to be moved towards one another. It has been shown that the welding torch is lighter and thus can be easier moved, but because of its long mounting, for example, hung from a ceiling structure, cannot be guided accurately enough and tends to oscillate. Since, on the other hand, a high-duty and precise construction is to be provided for the positioning and turning apparatus, it has been proven more advantageous to primarily move the workpiece and to let the welding torch—if possible—remain in a stationary position. Typically, the welding torch is only moved when it is to take a new operational position while the movement as regards the direction of a welding seam is taken over by the positioning and turning apparatus 22.

Thus, straight welding seams can be executed in any direction with a straightening of the cross carrier via ring bearing 41 in this direction and with the cross carrier only being moved in the direction of the lower or upper carrier.

For circular movements of the most varried configurations, the cross carrier can be moved so that the desired arch has its center point at the axis 46. After corresponding adjustment, only a rotary movement of the ring bearing 41 is required.

Simultaneous or separate rotary movements and translatory movements can be performed when such are required for complicated operations.

I claim:

1. Positioning and turning apparatus for positioning and turning heavy workpieces such as a workpiece to be welded, comprising a support stand, a first ring member mounted on said support stand, a first bearing ring of large diameter rotatably mounted on said first ring member, said first bearing ring being rotatable about a first axis, said first bearing ring having gear teeth, first drive means disposed on said support stand, a first gear wheel driven by said first drive means, said first gear wheel having gear teeth engaging the gear teeth of said first bearing ring for rotating the latter about said first axis, a first incremental angle coder means for controlling the angular disposition of said first bearing ring, an elongate carrier mounted on said first bearing ring, said carrier having a longitudinally extending axis, said carrier having an outer end portion, a second ring member mounted on said outer end portion of said carrier, a second bearing ring of large diameter mounted on said second ring member, said second bearing ring having an axis which is disposed perpendicular to said first axis, said second bearing ring having gear teeth, second drive means disposed on said carrier, a second gear wheel driven by said second drive means, said second gear wheel having gear teeth engaging the gear teeth of said second bearing ring for rotating the latter about said second axis, a second incremental angle coder means for controlling the angular disposition of said second bearing ring, cross carrier means mounted on said second bearing ring, said cross carrier means being movable in at least one direction in a plane perpendicular to said second axis, whereby a workpiece mounted on said cross carrier means is thereby rotatable about said first and second axes and movable in said at least one direction, and control means operable with said first and second incremental angle coder means to control the rotation of said first and second bearing rings about said fisst and second axes respectively such that the actual rotational position of said first and second bearing rings are compared with desired rotational positions of said first and second bearing rings respectively to provide a control signal for driving said first and second motor means respectively.

2. Positioning and turning apparatus according to claim 1 further comprising a first flange plate mounted on said first bearing ring, a second flange plate mounted on said carrier, each of said first and second flange plates having slots, and fastening means extending through said slots for fastening said first and second flage plates to one another at different relative positions depending on the relative positions of said slots on said first and second flange plates.

3. Positioning and turning apparatus according to claim 1, wherein said second bearing ring has a central opening, said outer end portion of said carrier mounting said second bearing ring such that the space underlying said central opening is a free open space.

4. Positioning and turning apparatus according to claim 1 further comprising larger roller bearings rotatably mounting said first bearing ring on said first ring member.

5. Positioning and turning apparatus according to claim 1 further comprising larger roller bearings rotatably mounting said second bearing ring on said second ring member.

6. Positioning and turning apparatus according to claim 1, wherein said cross carrier means has an upper carrier part and a lower carrier part, said lower carrier part being movable in a first direction, said upper carrier part being movable in a second direction, said first direction being perpendicular to said second direction, said upper and lower carrier parts being movable in a plane perpendicular to said second axis, whereby a workpiece mounted on said cross carrier means is thereby movable in said first and second directions.

7. Positioning and turning apparatus for positioning and turning heavy workpieces such as workpieces to be welded, comprising a support stand having a front side, a first ring member mounted on said front side, a first bearing ring of large diameter rotatably mounted on said first ring member, said first bearing ring being rotatable about a first axis, said first bearing ring having gear teeth, first drive means disposed on said support stand, a first gear wheel driven by said first drive means, said first gear wheel having gear teeth engaging the gear teeth of said first bearing ring for rotating the latter about said first axis, a first incremental angle coder means for controlling the angular disposition of said first bearing ring, a first flange plate mounted on said first bearing ring, a second flange plate, each of said first and second flange plates having slots, fastening means extending through said slots for fastening said first and second flange plates to one another at different relative positions depending on the relative positions of said slots in said first and second flange plates, an elongate carrier extending from said second flange plate, said carrier having a longitudinally extending axis, said carrier having an outer end portion, a second ring member mounted on said outer end portion of said carrier, a second bearing ring of large diameter mounted on said second ring member, said second bearing ring having a second axis which is disposed perpendicular to said first axis, said second bearing ring having gear teeth, second drive means disposed on said carrier, a second gear wheel driven by said second drive means, said second gear wheel having gear teeth engaging the gear teeth of said second bearing ring for rotating the latter about said second axis, a second incremental angle coder means for controlling the angular disposition of said second bearing ring, cross carrier means mounted on said second bearing ring, said cross carrier being movable in at least one direction in a plane perpendicular to said second axis, whereby a workpiece mounted on said cross carrier means is thereby rotatable about said first and second axes and movable in said at least one direction and wherein said carrier in displaceable relative to said support stand in multiple directions by adjusting the relative positions between said first and second flange plates, and control means operable with said first and second incremental angle coder means to control the rotation of said first and second bearing rings about said first and second axes respectively such that the actual rotational position of said first and second bearing rings are compared with desired rotational positions of said first and second bearing rings respectively to provide a control signal for driving said first and second motor means respectively.

8. Positioning and turning apparatus according to claim 7 further comprising detachable fastening means detachably fastening said first ring member to said front side of said support stand.

9. Positioning and turning apparatus according to claim 8 further comprising detachable fastening means detachably fastening said second ring member to said carrier.

10. Positioning and turning apparatus for positioning and turning heavy workpieces comprising a support stand having a vertically disposed front side, a first ring member mounted on said front side, a first bearing ring of large diameter rotatably mounted on said first ring member, said first bearing ring having a first axis which is horizontally disposed, said first bearing ring having internal gear teeth, first drive means disposed within said support stand, a first gear wheel driven by said first drive means, said first gear wheel having a diameter less than the diameter of said first bearing ring, said first gear wheel having external gear teeth engaging the internal gear teeth of said first bearing ring for rotating the latter about said first axis, a first incremental angle coder means on said first drive means for controlling the angular disposition of said first bearing ring, a vertically disposed first flange plate mounted on said first bearing ring, a vertically disposed second flange plate, each of said first and second flange plates having elongated slots, fastening means extending through said slots for fastening said first and second flange plates to one another at different relative positions depending on the relative positions of said slots in said first and second flange plates, an elongate carrier extending from said second flange plate, said carrier having its axis horizontally disposed, said carrier having an outer end portion, a second ring member mounted on said outer end portion of said carrier, a second bearing ring of large diameter mounted on said second ring member, said second bearing ring having an axis which is disposed perpendicular to said first axis, said second bearing ring having internal gear teeth, second drive means disposed on said carrier, a second gear wheel driven by said second drive means, said second gear wheel having a diameter less than the diameter of said second bearing ring, said second gear wheel having external gear teeth engaging the internal gear teeth of said second bearing ring for rotating the latter about said second axis, a second incremental angle coder means on said second drive means for controlling the angular disposition of said second bearing ring, cross carrier means mounted on said second bearing ring, said cross carrier means having an upper carrier part and a lower carrier part, said lower carrier part being movable in a first direction, said upper carrier part being movable in a second direction, said first direction being perpendicular to said second direction, said upper and lower carrier parts being movable in a plane perpendicular to said second axis, whereby a workpiece mounted on said cross carrier means is thereby rotatable about said first and second axes and movable in said first and second directions and wherein said carrier is displaceable relative to said support stand in multiple directions by adjusting the relative positions between said first and second flange plates, and control means operable with said first and second incremental angle coder means to control the rotation of said first and second bearing rings about said first and second axes respectively such that the actual rotational position of said first and second bearing rings are compared with desired rotational positions of said first and second bearing rings respectively to provide a control signal for driving said first and second motor means respectively.

11. Positioning and turning apparatus according to claim 10, wherein said first bearing ring has a first central opening, the outer boundary of said first central opening being defined by said internal gear teeth of said first bearing ring, said first gear wheel being disposed within said first central opening of said first bearing ring.

12. Positioning and turning apparatus according to claim 10, wherein said second bearing ring has a second central opening, the outer boundary of said second central opening being defined by said internal gear teeth of said second bearing ring, said second gear wheel being disposed within said second central opening of said second bearing ring.

13. Positioning and turning apparatus according to claim 10, wherein said carrier comprises an elongate carrier housing, said second motor means being disposed within said carrier housing, said second motor means comprising a second motor rotatable about a second motor axis, said second gear wheel being rotatable about an axis perpendicular to said second motor axis.

14. Positioning and turning apparatus according to claim 10, wherein said support stand comprises an elongate vertical housing, said first motor means being disposed in said housing, said first motor means comprising a first motor rotatable about a first motor axis, said first gear wheel being rotatable about an axis perpendicular to said first motor axis.

* * * * *